Jan. 4, 1966     J. H. LEMELSON     3,227,642
FLUID PROCESSING APPARATUS AND METHOD
Filed Feb. 26, 1964
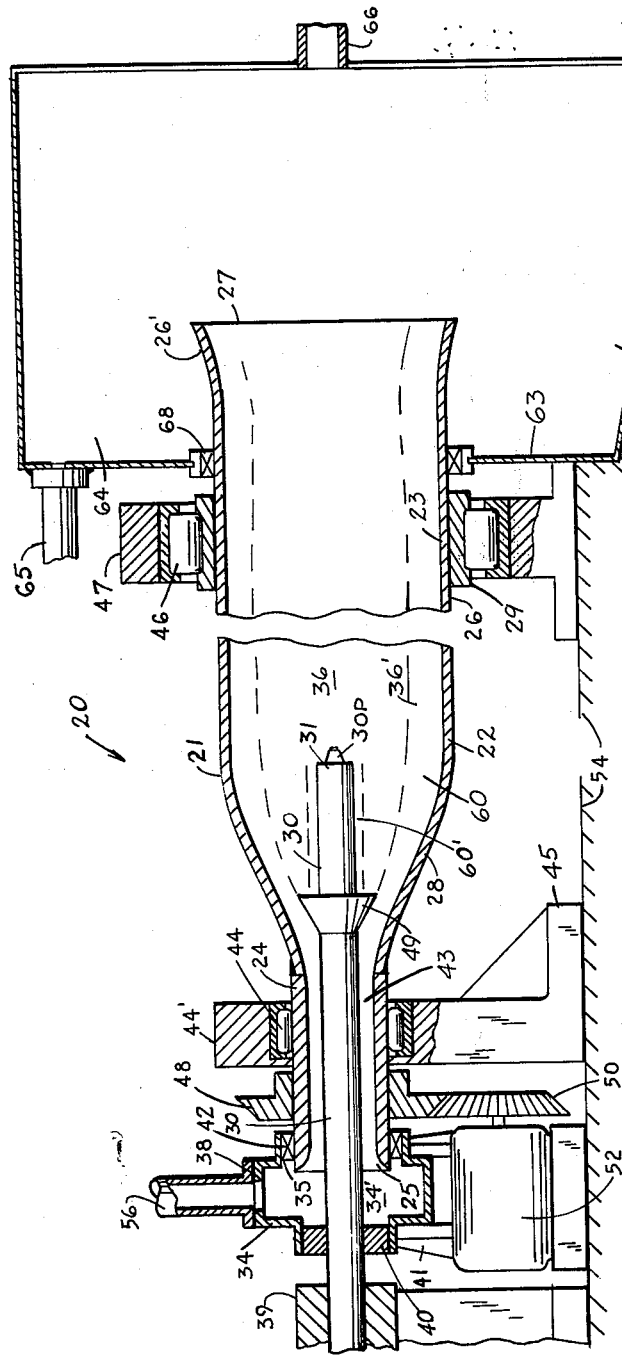
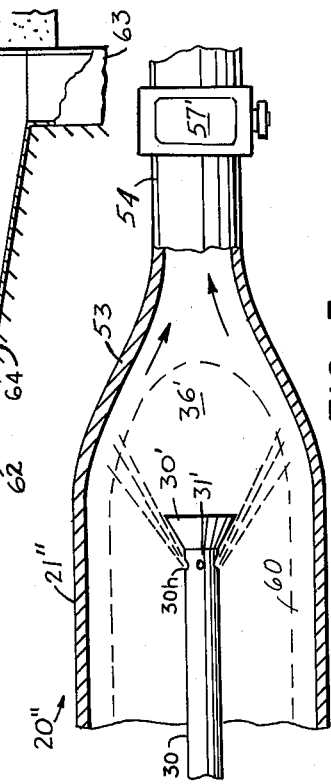
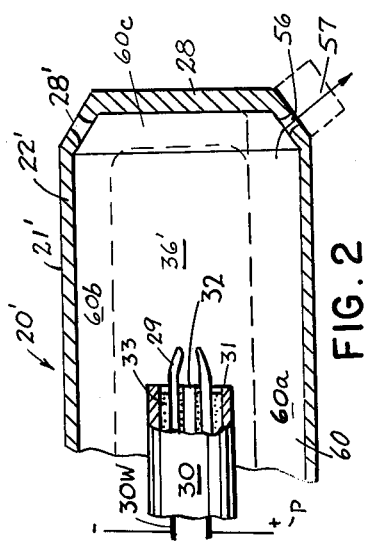
INVENTOR
JEROME H. LEMELSON United States Patent Office 3,227,642
Patented Jan. 4, 1966

1

3,227,642
FLUID PROCESSING APPARATUS AND METHOD
Jerome H. Lemelson, 85 Rector St., Metuchen, N.J.
Filed Feb. 26, 1964, Ser. No. 347,524
16 Claims. (Cl. 204—168)

This invention relates to reaction apparatus and is a continuation-in-part of my copending applications, Serial No. 681,087, filed August 29, 1957, and S.N. 668,561, filed June 27, 1957, both now abandoned. In particular, the apparatus presented herein is operative to generate high temperatures and is provided with self-contained heat transfer means.

Heat transferred to the walls of most high temperature reaction apparatus frequently presents problems in the design and construction of said apparatus which may only be solved by the provision of an elaborate heat transfer system including fluid conduction means surrounding the exterior surface of the reaction chamber. However, the interior surface of the reaction chamber wall is exposed to the direct heat radiated and/or conducted thereto by the reaction products. Depending on the temperatures involved in the reaction and the characteristics of the material comprising or lining the inside surface of the wall of the reaction chamber, said wall or lining may be subject to rapid deterioration, wear or destruction due to rapid expansion and temperature corrosion. In certain reactions which occur at relatively high temperatures (2000° Fahrenheit and above) conventional materials are not practical in applications for use in reaction chambers due to temperature corrosion and shortcomings such as cost are experienced in using so-called high temperature materials in the construction of the reaction chamber.

Accordingly, it is a primary object of this invention to provide a new and improved reaction apparatus and method applicable for high temperature use and producible at low cost.

Another object is to provide a reaction apparatus including a reaction chamber, the walls of which may be made relatively light and of relatively low cost conventional materials.

Another object is to provide a high temperature reaction chamber provided with liquid heat transfer means in the form of liquid disposed within the chamber and operative so as to maintain the temperature of the chamber wall, such that the application of heat transfer fluid within or exterior of the wall is not needed during a high temperature reaction.

Another object is to provide an improved reaction apparatus employing spark discharge means within a reaction chamber operative to improve or to create chemical reactions and a plurality of fluids at least one of which changes in composition as the result the generation of high voltage discharges within said chamber.

Another object is to provide an improved reaction chamber capable of being utilized for performing a variety of different physical and chemical processes at high temperatures.

These as well as further objects, features and advantages of the present invention will be best appreciated by reference to the following detailed description which makes reference to the drawings wherein:

FIG. 1 is a side view, with parts broken away for clarity, of a reaction apparatus made in accordance with the teachings of the invention, FIG. 2 is a partial view of a reaction apparatus employing spark discharge means to effect chemical reactions, and FIG. 3 is a partial view in cross section of a modified form of the reaction apparatus of FIG. 1.

2

In FIG. 1 is shown a reaction apparatus employing a liquid introduced into a reaction chamber as a heat transfer medium operative to maintain the temperature of the wall of the apparatus relatively low enough to prevent damage or destruction thereto during the generation of high temperatures within the reaction chamber. The heat transfer liquid may take part in the reaction or may be used primarily for heat transfer purposes per se depending on the type of reaction and the components thereof.

The reaction apparatus 20 of FIG. 1 comprises an elongated reaction chamber 21 having a main reaction chamber portion 22 thereof of substantially cylindrical shape and with a side wall having a cylindrical interior surface 23. The main reaction chamber 22 necks-down along a portion 28 to an inlet portion 24, also preferably of cylindrical interior shape, which is supported for rotation within a roller bearing means 44 supported by a block or base 45 off the floor or frame 54 supporting the apparatus. The main chamber portion 22 has a supporting ring or band 29 welded or otherwise secured to the side wall 26 thereof and is supported for rotation by means of a second roller bearing 46 which is supported by a bracket or large pillow block 47 also secured to 54. Thus, the reaction chamber 21 may be rotated about its longitudinal axis which is preferably substantially horizontal. The end of the necked-down portion 24 of the reaction chamber 21 is open at 25 and extends into a plenum or chamber 34 which is supported and remains stationary during the rotation of 21. A rotary seal 42 is provided between the outside wall of 24 and the opening 35 in chamber 34 so that a fluid seal is effected between the interior volume 34' of 34 and the volume defined by the tubular section 24 for the flow of heat transfer fluid between the two. One or more inlet lines such as pipe 56 are connected to the wall of chamber 34 for flowing a fluent or liquid material thereto for admitting said material to the annular volume 43 defined by tubular section 24 and a centrally disposed conduit member 30 which projects into the main reaction chamber 22. Inlet line 56 is connected to a pressurized source of heat transfer fluid such as a controllable pump for flowing liquid into the chamber 22.

The reaction chamber assembly is rotated while the plenum 34 is fixedly supported on a mount 41 and conduit 30 is supported by an end wall 40 of 34 and a mount or stand 39 situated behind the plenum. The conduit 30 contains one or more passageways extending therethrough or pipes for conducting reaction fluids to a burner or other device 30P shown secured at the end of 30 and operative to generate intense radiation or high temperatures in the reaction zone 36 immediately surrounding the end 31 of member 30. Member 30 may also contain other devices such as electrical wires or cable for operating or positioning device 30P, regulating the flow of fluids from 30 into the reaction zone or measuring process variables.

Rotation of the chamber 21 is effected by means of a variable speed controlled motor 52 having a bevel gear 50 secured to its output shaft which meshes with a bevel gear 48 axially secured to the inlet section 24 and rotatable therewith.

The exhaust end 27 of chamber 21 is open and extends into an exhaust chamber or plenum 62 adapted for receiving liquid 60 admitted through inlet 56 and flowed along the wall of the reaction chamber and/or the products of reaction which may comprise gases and/or the liquid exhausted thereto or chemicals dissolved or otherwise provided in the liquid. The end of wall 26 is shown outwardly flared at 26' and a rotary seal 68 is provided between wall 26 of the rotating chamber and the front wall 63 of the plenum 62. One or more inlet lines 65 to chamber 62 are provided for admitting one or more fluids to the volume 64 bounded thereby which may be used to react with the fluids exhausted thereto. The exhaust fluid 60 may comprise a liquid such as water used primarily for heat transfer purposes to protect the wall of the combustion chamber or may comprise or contain one or more elements or compounds adapted to partake in the chemical reaction generated by operation of the radiation or combustion device 30P disposed at the end of conduit 30. In other words, either the liquid 60 itself may comprise a reactant for the process or act as a carrying medium for one or more reactants carried thereby or dissolved therein.

In one form of the invention, the chamber 21 is rotated at a speed sufficient to maintain the wall surface 23 wetted by the liquid 60 such that it will not be destroyed or damaged by the heat generated within zone 36 and will be maintained at a substantially constant or predetermined temperature substantially below the melting point of the material of which the wall 22 is made or below that temperature at which heat corrosion will become excessive. As the angular velocity of the chamber 21 is increased by increasing the speed of motor 52, a condition will be experienced within the chamber in which a wall of liquid will form and flow along substantially the entire interior surface 23 of the chamber wall defining reaction zone 36, by means of centrifugal force and most of the direct radiation generated by combustion or operation of the radiation device 30P will be directed against said wall of liquid before reaching the surface 23. This, of course, assumes that there is sufficient rate of flow of liquid through inlet line 56 to maintain a wall of liquid about the entire interior surface 23 of the reaction chamber. The depth of the wall of liquid will be a function of the volume rate of flow of said liquid and the rotational velocity of the chamber. If conduit 30 is centrally disposed within chamber 21 as illustrated and the device 30P is a burner, plasma arc generator or other point source of heat or radiation substantially all the liquid flowing past said radiation device will be subject to the same degree of radiation so as to provide means for effecting a controlled reaction or irradiation.

Other features of the embodiment illustrated in FIG. 1 include the provision of a frusto-conical deflector 62 for the liquid 60 flowing from inlet conduit 24 to guide said liquid along the wall of the outwardly expanding section 28. Notation 60' refers to a portion of the inlet liquid adapted to be flowed along that portion of conduit 30 which projects into the volume 36 which is void of the liquid 60 so as to maintain the end of 30 at a low enough temperature, if necessary, to prevent its destruction by heat generated within the combustion or reaction chamber. The liquid 60' flowing along the end of 30 may be vented through the deflector 62 or through openings in the wall of 30.

In FIG. 1, the end 27 of chamber 21 is shown open and projects into an exhaust chamber or tank 62 adapted to receive said liquid as it flows out of said chamber 21. Said liquid may be removed through one or more pipes 63, 66 from volume 64 by gravity or pumping means and either recirculated or flowed to storage means or the apparatus operative for filtering or further processing the reaction products contained in or comprising said liquid.

The apparatus of FIG. 1 may be mounted for rotation about a horizontally disposed axis as illustrated or disposed in any suitable attitude including vertically disposing chamber 21 with the open end 27 downwardly or upwardly facing. Heat transfer and/or reactant liquid or vapor may also be flowed through the interior of conduit 30 for cooling same and/or partaking in the chemical-temperature reaction or operation of device 30P at the end of 30. If 30P is a plasma arc generator utilizing a liquid such as water, said liquid along with other reactant fluids are flowed through the interior of conduit 30 or other conduits disposed therein.

In FIG. 2 is shown a modified form of the apparatus of FIG. 1. Reaction apparatus 20' of the type shown in FIG. 1 is provided with a combustion or reaction chamber 21' adapted, as described, for rotation about its longitudinal axis and having a substantially cylindrical side wall 22'. Unlike the apparatus of FIG. 1, the downstream end of the cylindrical combustion chamber 21' is closed by means of a wall 28 which prevents or restricts the flow of liquid 60 from the chamber. One or more small openings 56 may be provided in a portion 28' joining the end wall 28 and side wall 22' of the reaction chamber for permitting the flow of a reduced amount of liquid 60 from the chamber and such flow may be regulated, varied or stopped by means of a valve or valves 57 secured to wall portion 28'. The valve 57 may be remotely controllable to open and close at different times in a reaction cycle or adjusted in opening to predetermine the rate of flow of liquid from the chamber prior to operation of the apparatus. Remote control of said valve or valves during a cycle may be effected by providing a solenoid valve control or servo-motor mounted thereon and extending wires along the outside surface of the combustion chamber wall 22' to circular commutator rings which are swept by electrical brush element which are fixedly mounted, for example, on the mount 47'. Thus, depending on the rotational velocity of chamber 21', the heat transfer and/or reaction liquid 60 may become disposed in depth along the bottom of the chamber as at 60a to protect the wall portions 21', 28 and 28' by constantly wetting said as the chamber rotates, or, if the rotational velocity is high enough, said liquid may become disposed in depth completely around the cylindrical wall 22' including along the side and top portions thereof as at 60a and 60b as well as forming in depth along the end wall 28 as at 60c.

Also illustrated in FIG. 2 are modifications to the radiation device, support and conduit 30. In FIG. 1, the device 30P mounted at the end of conduit member 30 has been defined as a burner or plasma arc generating device adapted to receive fluids flowed through the conduit 30 and effect the combustion or reaction of same therein and in the volume 36 referred to as the reaction zone. Various other devices may be employed on or at the end 31 of member 30 including a source of atomic radiation or other means for generating temperature reactions in the chemicals introduced into the reaction chamber. Illustrated in the figure are a plurality of electrodes 29 insulatedly mounted within member 30 on a cylindrical base 33 made of ceramic or other suitable electrical insulation. The electrodes are shown protruding from the end 31 of conduit 30 although they may be shielded or otherwise provided to effect the desired end results. One or more reaction fluids may be introduced through one or more conduits such as centrally disposed conduit 32 shown extending through the center of member 30 and exhausting between the electrodes 29 as illustrated.

The electrodes 29 are connected to a suitable source of potential by means of wires or cable 30W extending along the interior of 30 and connected to leads (not shown) extending to said potential source P. The potential source may comprise means for generating a continuous electrical spark discharge or arc across the gap between the electrodes in the reaction fluid flowing therebetween and/or means for intermittently generating high voltage spark phenomena between the electrodes which are operative to generate intense shock waves in volume 36' immediately surrounding said electrodes. Various chemical reactions may be automatically and rapidly effected in the fluids introduced through conduit member 30 and the liquid 60 as described hereafter, a typical reaction being the electric arc pyrolysis of hydrocarbons for producing various hydrocarbon products.

In FIG. 3 is shown further modifications to the apparatus hereinabove described. The apparatus 20" is constructed with a cylindrical combustion chamber wall portion 21" a portion of which is shown in FIG. 3, the remainder being fabricated as shown in FIG. 1. A heat transfer liquid is caused to flow along the entire interior surface of the wall 21" and along a portion 53 thereof of reducing cross section to an extension 54 of said wall of smaller diameter than portion 21". If the volume rate of flow of liquid 60 is great enough, said liquid will completely fill the conduit extension 54 of the combustion chamber and a portion of the necked down section 53 of said chamber as illustrated by the dashed lines so that a volume 36' which is void of liquid is disposed about the end of conduit 30 and is bounded entirely by liquid in a flowing state. Hence, combustion or radiation means as heretofore described may be mounted at the end of member 30 for creating a chemical reaction in volume 36' and/or in the liquid 60 as it flows past said combustion device. In the embodiments of the invention illustrated in FIGS. 2 and 3 the components not shown but illustrated in FIG. 1 are applicable to the apparatus illustrated and heat transfer liquid flowed over the exterior surface of the conduit 30 may cooperate with the fluid or fluids flowed through 30 to protect the latter and the radiation or burner device from the intense temperatures generated within the reaction zone. Notation 57' refers to a valve or adjustable gate disposed across the reduced cross section portion 54 of the extension of the chamber and operative for retaining liquid and combustion products within chamber 21" or regulating the flow therethrough in accordance with process requirements. The end portion 31' of conduit 30 is shown provided with a frusto-conical deflector 30' which serves as means for deflecting fluid or fluent materials ejected through holes 30h in 30 against and into the liquid 60 formed along the wall of the chamber to be affected thereby or react therewith. For example, liquid metal flowed through conduit 30 from a furnace or liquified at the end of 30 or 30' by means of a burner or plasma arc device may be ejected through the openings or nozzles 30h provided along 30 into the flowing liquid 60 for the purpose of suddenly solidifying same into particles, assuming that said metal is atomized during the ejection thereof from 30. Other chemicals in particulate or liquid form may be similarly ejected as streams or atomized droplets into the surrounding flow of liquid 60 at a steady flow rate and exhausted through section 34 after reacting with said liquid or being solidified thereby. Various chemical reactions between two fluids or particles and liquids may be effected by means of the apparatus of FIG. 3 which are effected with or without the generation of an arc, burning or other radiation means disposed at the end of 30 or 30'.

The apparatus illustrated in FIGS. 1–3 may be operated in a number of different manners to provide different reactions depending on the materials employed within the chamber and the manner in which they react. For example, the chamber 21 may be rotated at sufficient velocity and the flow of liquid 60 such that said liquid will form a wall completely around the interior of the chamber which serves as a constantly moving heat transfer blanket protecting said chamber wall from the heat of the reaction. By reducing the speed or rotation of the drive motor 52 and correspondingly regulating the flow of heat transfer or reaction liquid through the inlet 56, liquid may flow into the lower portion 36' of the chamber and serve as a heat transfer medium as it makes contact with different portions of the chamber wall as said chamber rotates. Said liquid 60 may serve as a heat transfer medium and may simultaneously partake in the reaction. The material introduced through the conduit 30 may comprise one or more gases operative to burn at high temperature within the reaction chamber or otherwise react with material already therein, a gas and a liquid or vapor or combinations of these materials.

The rate of rotation of chamber 21 will depend upon the quantity and type of materials introduced into the chamber, type and rate of reaction, thickness and corrosion resistance of the walls of the chamber, etc.

In FIGS. 2 and 3 notation 60' refers to that portion of the heat transfer liquid which has formed against the far end of the reaction chamber in its flow therefrom. In FIG. 2 the volume 36' within the reaction chamber is shown as defined by liquid 60' at one end thereof and is bounded by a wall of liquid 60 blanketed against the inside surface of the cylindrical chamber and formed by rotation of the chamber at sufficiently high velocity to maintain said wall of liquid in place against the chamber wall by centrifugal force. In FIG. 3 the liquid portion 60" flowing from the side walls is disposed inward of the necked-down exhaust duct 78 and defines an end wall to the volume 36'. Thus in FIGS. 2 and 3 the reaction zone 36' is substantially totally enclosed within a surrounding wall of liquid. In FIG. 1 as well as in the other embodiments, liquid may also be flowed over the wall of the conduit 30 as illustrated at 60a to transfer heat therefrom. Notation 31 refers to a frusto-conical deflector disposed around that portion of conduit member 30 as it exits from the tubular portion 24 and is operative to deflect liquid outwardly along the outwardly tapering portion 28 of the chamber wall.

The apparatus described and illustrated in FIGS. 1 to 3 may be used for various test and process functions such as:

(a) Processes involving the formation of particles of materials such as metals including metal powders by the spray and atomization of said metals from a liquid state or of pre-formed particles heated and ejected into a reducing gas or air in the volume 36 and and thence into the liquid. the inner duct 30 shown in FIG. 1 may contain one or more pipes for conducting a liquid metal to the end 30' thereof at which is mounted a nozzle or small orifice for atomizing said liquid into fine particles or into the filaments. The nozzle or nozzles may be directed oblique to the longitudinal axis of 22 to eject the sprayed material so that it will obliquely strike and be carried downstream by the liquid alongside the walls of 26. Also applicable to the illustrated apparatus, is any process requiring the atomizing or formation of material requiring processing in a liquid after passing through a gas.

(b) Processes involving high temperatures which may ordinarily cause destruction of the walls of the chamber in which they occur. The constantly moving liquid formed along the inside of the chamber 26, due to its motion relative to the chamber wall as the latter rotates is an excellent heat transfer mechanism protecting the walls of 22. The chamber 22 may be made of heavier wall thickness than illustrated and may be made of metal or high temperature ceramic.

(c) Fluid mixing, reaction and dispensing apparatus in which a first fluid or fluids introduced through one or more tubes in central duct 30 is injected into chamber 26 reacts and/or mixes with the liquid flowing along the walls thereof. The end of duct 26 is preferably closed or restricted as in FIGS. 2 or 3 to improve said mixing and reaction. An electric arc or burner mounted on the end of 30 and acting to create a reaction with fluid in said chamber or introduced through 30 or 63 may be utilized by generating an arc, flame or spark discharges at a predetermined frequency. A so-called plasma arc may be utilized for reaction purposes within the water enclosed volume 36 generated on the mount 30, as at 30P.

(d) Fluid processing functions involving high energy atomic or other forms of irradiation of the liquid covering the wall of chamber sections 26 and 28 as it flows down said tube may be effected in a continuous and highly efficient manner. A source of radiation positioned along the longitudinal axis of duct 22 will be essentially the same radial distance from all points on the surface of the liquid wall 60 in a plane perpendicular to said axis. As a result, if the layer 60 of liquid is not too deep, a condition of maximum radiating efficiency is attained since the liquid completely surrounds said source. Furthermore, said liquid may serve as a partial shield for said radiation, as it completely surrounds the source.

One or more devices may be mounted within the reaction chamber as described, which chemically change working material such as one or more of the fluids introduced into the chamber and utilize a high temperature generating means such as burner means including means for generating a plasma arc, arcing or spark generating electrodes, electron beam generating means, laser means for generating an intense light beam or explosion means for generating intense shock waves in the fluid therein. These devices may be used to create various chemical reactions in the liquid or liquids and/or gases introduced into the chamber. For example, a plasma or spark generating device centrally disposed in chamber 21 may be utilized in various fixation processes such as nitrogen fixation whereby irreversible chemical changes occur within the chamber as the result of the high generated temperature and the reaction between a plurality of the fluids introduced into the chamber. The liquid 60 introduced through 56 may partake in the reaction and/or may serve as a carrier for removing the resulting product or products of the reaction from the chamber in addition to means for transferring the major portion of the heat of reaction from the chamber so that said heat will not be radiated to the walls of the chamber and destroy or damage same.

In the processing apparatus hereinabove described and illustrated in the drawings, it is noted that the embodiments of FIGS. 1 to 3 may each have any of the described reaction devices disposed along or at the end of the fluid inlet conduit 30. These devices may include any form of burner or flame holder adapted to effect high temperature combustion of the fluids admitted to the chamber through the centrally disposed conduit 30 and/or through inlet lines such as 56. These may include a so called plasma-arc torch or generator adapted to receive water through conduit 30 or other liquid of any suitable composition such as one which partakes in the chemical reaction and is operative to generate the plasma surrounding the conventional electrodes of the plasma generator. One or more reaction liquids may supplement or replace water fed to the plasma arc generator through 30 to effect different chemical reactions and these may include various liquid hydrocarbons, liquified gases or the like flowed through different conduits extending along 30 and terminating and the burner or plasma generator 30P. Other temperature or radiation generating means mounted on or at the end of 30 may include one or more electrodes for generating electrical arcs of predetermined characteristics, sparks or the like. Solid, powder or liquid fuels, explosives or propellants may also be burned or exploded at the end of member 30 to create controlled chemical reactions within the reaction zone.

I claim:

1. A continuous method for creating a chemical reaction and transferring heat generated by said reaction which comprises:
   (a) continuously introducing a fuel to a reaction zone defined by a substantially horizontal cylindrical wall that is composed of material which is normally adversely affected by heat,
   (b) burning said fuel within a central portion of said zone that is spaced from the wall defining the reaction zone and is also spaced from the end of the reaction zone to which said fuel is admitted,
   (c) simultaneously introducing a liquid having heat-transfer properties to the reaction zone in which said fuel is burned at a location such that said fuel is burned downstream from the location at which the liquid is introduced,
   (d) continuously rotating said cylindrical wall around said burning fuel at an angular velocity sufficient to cause said heat-transfer liquid to be retained on said cylindrical wall as a cylindrical formation of heat transfer liquid which is spaced from said burning fuel,
   (e) and removing said liquid from the reaction zone downstream from the location at which said liquid was introduced at a rate that is sufficient for the liquid to maintain the wall defining the reaction zone at a temperature below which the wall would be adversely affected.

2. Chemical reaction apparatus comprising in combination with an elongated reaction chamber having a wall defining a zone in which chemical reactions occur, an opening in said wall to said reaction zone, a fluid conduit supported within said chamber and extending through said opening into said reaction zone, means for admitting fluids including a first reaction material in the form of a fluid through said conduit into said chamber, means for admitting a second reaction material through said opening in said wall and disposing said second material as a liquid against said wall in said reaction zone, means for supporting said reaction chamber for rotation about its longitudinal axis, means within said chamber for burning said first fluid for creating a high temperature reaction within said chamber and transferring the heat of said reaction to said liquid disposed against the wall of said chamber, and power means operative for rotating said chamber to cause relative motion of said liquid and the wall of said chamber for retaining at least part of said liquid against at least a portion of said wall at all times and preventing continuous and direct transfer of heat from said reaction to any one portion of said wall.

3. Fluid processing apparatus comprising in combination, an elongated duct of substantially circular internal cross section, an elongated supporting member mounted within said duct and having a substantially cylindrical external surface defining a substantially cylindrical annular volume with a portion of said elongated duct, a fluid inlet to said annular volume, means for admitting a liquid to substantially fill said annular volume, a portion of said elongated duct increasing in diameter beyond that portion defining said annular volume and adapted for receiving liquid from said annular volume, means for supporting said duct for rotation about its longitudinal axis, and means for rotating said duct, the quantity of said liquid and the velocity of rotation being sufficient to cause said liquid to become distributed around at least part of the interior surface of said duct as a wall of liquid by means of centrifugal force, an open discharge end in said duct for discharging said liquid at a rate whereby a volume void of said liquid is defined axially within said duct, which volume is surrounded at least in part by said liquid and radiant energy generating means supported within said volume void of liquid and positioned longitudinally within said duct.

4. Fluid processing apparatus comprising in combination, an elongated duct of substantially circular internal cross section, an elongated supporting member mounted within said duct and extending a substantial distance therein, said elongated supporting member defining an annular volume with the wall of said duct, a fluid inlet to said annular volume, means for admitting a liquid to said inlet in a manner such that said liquid substantially fills said annular volume, a portion of said elongated duct increasing in diameter beyond that portion defining said annular volume, means for supporting said duct for rotation about its longitudinal axis, and means for rotating said duct, the quantity of said liquid and the velocity of rotation being sufficient to cause said liquid to become distributed around at least part of the interior surface of said duct as a layer of liquid by means of centrifugal force, an open discharge end in said duct for discharging said liquid at a rate whereby a volume void of said liquid is defined axially within said duct, which volume void of said liquid is surrounded at least in part by said liquid and radiant energy generating means supported within said volume void of liquid and positioned longitudinally within said duct.

5. Chemical reaction apparatus comprising in combination:
   (a) a reaction chamber having a wall portion defining a reaction zone interior thereof for containing chemical reactions,
   (b) a plurality of inlet conduits coupled to said chamber and communicating with said interior of said chamber,
   (c) electrical spark discharge means disposed within said chamber within said reaction zone,
   (d) means for admitting a first fluid in the form of a liquid reactant through a first of said inlet conduits to partly fill said chamber,
   (e) means for admitting a second fluid comprising a reactant gas through a second inlet conduit to fill the volume in said reaction zone void of said liquid,
   (f) means for energizing said spark discharge means to cause electrical arcing thereacross in the volume containing said reactant gas and to create a chemical reaction in said chamber involving said gas and said liquid.

6. Chemical reaction apparatus comprising in combination:
   (a) a reaction chamber having a wall portion defining a reaction zone interior thereof for containing chemical reactions,
   (b) fluid inlet conduit means coupled to said chamber and communicating with said interior of said chamber,
   (c) a plasma arc generating means supported within said reaction zone and coupled to receive fluids from said inlet conduit means,
   (d) means for admitting a liquid to said chamber and disposing said liquid adjacent said plasma arc generating means and a portion of the wall of said chamber,
   (e) and means for maintaining said liquid and said chamber wall in constant rotational motion to transfer heat generated by said plasma arc generating means.

7. A combustion apparatus comprising:
   (a) a combustion chamber of substantially symmetrical shape and having a wall of substantially circular internal cross section,
   (b) an inlet portion of said chamber having a wall of a first diameter,
   (c) a main working portion of said chamber of substantially greater diameter than said inlet portion,
   (d) an intermediary portion of circular cross section of said chamber of increasing diameter joining said inlet portion and said main working portion,
   (e) a conduit centrally supported within said inlet portion,
   (f) said conduit being adapted for flowing a reaction fluid into said chamber,
   (g) means for admitting liquid to said inlet portion and flowing said liquid to partially fill said main working portion,
   (h) combustion means for generating a high temperature reaction within said main working portion of said chamber, and
   (i) means for rotating said chamber at a speed to effect relative movement of the wall of said main working portion and said liquid whereby to maintain said chamber wall at a reduced temperature by transferring heat to said liquid.

8. Chemical reaction apparatus comprising in combination with a reaction chamber having a side wall portion of substantially cylindrical internal configuration and defining a reaction zone in which chemical reactions may occur, means for supporting said reaction chamber for rotation about the longitudinal axis of the side wall of substantially cylindrical internal configuration, means for admitting a plurality of reactant materials to said chamber reaction zone, said materials including at least one reactant gas and a second material disposed as a liquid in depth along the side wall of cylindrical configuration, means for generating high temperatures within said reaction zone by the combustion of said gas and involving its reaction with said liquid, and power means operative for rotating said chamber to cause relative motion between said liquid and the wall of said chamber as the reaction progresses whereby a substantial portion of the heat of said reaction is transferred to said liquid and the chamber wall is protected thereby.

9. A combustion apparatus comprising in combination:
   (a) a combustion chamber having a wall with a substantially cylindrical interior surface defining a reaction zone,
   (b) said chamber being adapted to contain a liquid,
   (c) said chamber being disposed horizontally and being supported for rotation about the longitudinal axis thereof, whereby when said cylinder is rotated, liquid partially filling said chamber is disposed against at least a portion of said cylindrical wall and is maintained in constant motion relative to said wall,
   (d) an elongated rigid conduit centrally supported within said chamber for admitting reaction fluid to said chamber,
   (e) and a burner disposed at the end of said conduit through which said reaction fluid flows, said burner being spaced from said wall of said chamber and being adapted to receive and burn said fluid, whereby heat is radiated from said burner towards said wall of said chamber and said liquid which is in constant motion relative to said wall maintains the temperature of said wall substantially constant.

10. Apparatus in accordance with claim 9, wherein said conduit means for admitting reaction fluid to said chamber includes a plurality of passageways for the simultaneous admission of a plurality of fluids to said chamber.

11. Apparatus in accordance with claim 9, wherein said burner comprises a plasma arc torch disposed within said reaction chamber and spaced from said cylindrical wall thereof, said plasma arc torch being operative to transfer sufficient heat to said fluid to create a chemical reaction.

12. A combustion apparatus comprising in combination:
   (a) a combustion chamber having a wall with a substantially cylindrical interior surface defining a reaction zone,
   (b) said chamber being adapted to contain a liquid,
   (c) said chamber being supported for rotation about the longitudinal axis thereof, whereby when said chamber is rotated liquid partially filling said chamber is disposed against at least a portion of said cylindrical wall and is maintained in constant motion relative to said wall,
   (d) an elongated rigid conduit centrally supported within said chamber for admitting reaction fluid to said chamber,
   (e) and electrical spark generating means disposed within said chamber and spaced from said wall, said spark generating means being associated with said conduit for admitting reaction fluid whereby, as a result of subjecting said reaction fluid to spark discharge, heat is radiated towards the wall of said chamber and said liquid disposed against said wall maintains the temperature of said wall substantially constant.

13. A combustion apparatus comprising in combination:
   (a) a combustion chamber having a wall with a substantially cylindrical interior surface defining a reaction zone,
   (b) said chamber being adapted to contain a liquid,
   (c) said chamber being supported for rotation about the longitudinal axis thereof, whereby when said chamber is rotated liquid partially filling said chamber is disposed against at least a portion of said cylindrical wall and is maintained in constant motion relative to said wall, (d) means disposed within said chamber for admitting reaction fluid to said chamber, (e) and wave generating means disposed within said chamber and associated with said means for admitting reaction fluid, said wave generating means being operative to generate in the reaction fluid a series of shock waves that are of sufficient intensity to create a chemical change in said fluid and generate high temperatures therein, whereby heat is radiated towards the wall of said chamber and said liquid disposed against said wall maintains the temperature of said wall substantially constant.

14. Chemical reaction apparatus comprising in combination with an elongated combustion zone, means for admitting a liquid reactant to said chamber and for constantly moving said liquid longitudinally through said chamber, a zone within said chamber adapted to contain a gas, means for admitting gas to said chamber, electrode means disposed within said chamber within said zone for containing a gas, means for intermittently generating an electrical discharge across said electrode means to cause a chemical reaction in said gas and to cause said gas to react with said liquid.

15. Chemical reaction apparatus in accordance with claim 14, said electrode means being centrally disposed in said reaction chamber.

16. Reaction apparatus in accordance with claim 14, said reaction chamber having a wall with a substantially circular internal cross section, said electrode means being centrally disposed within said chamber and operative to generate intense heat in the gas contained in said zone within said chamber.

References Cited by the Examiner

UNITED STATES PATENTS 2,895,799   7/1959   Le Baron et al. _____ 23—109

JOHN H. MACK, *Priamry Examiner.*

HOWARD S. WILLIAMS, *Assistant Examiner.*